(12) United States Patent
Takagi et al.

(10) Patent No.: US 9,612,439 B2
(45) Date of Patent: Apr. 4, 2017

(54) TRANSMISSIVE DISPLAY APPARATUS

(71) Applicant: SEIKO EPSON CORPORATION, Tokyo (JP)

(72) Inventors: Masayuki Takagi, Matsumoto (JP); Takahiro Totani, Suwa (JP); Takashi Takeda, Suwa (JP); Akira Komatsu, Tatsuno (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/054,620

(22) Filed: Feb. 26, 2016

(65) Prior Publication Data

US 2016/0259167 A1 Sep. 8, 2016

(30) Foreign Application Priority Data

Mar. 3, 2015 (JP) ................................. 2015-041017

(51) Int. Cl.

| | |
|---|---|
| *G02B 27/14* | (2006.01) |
| *G09G 5/00* | (2006.01) |
| *G02B 27/01* | (2006.01) |
| *G02B 5/02* | (2006.01) |
| *G02B 27/28* | (2006.01) |
| *G02B 5/30* | (2006.01) |
| *G02B 5/18* | (2006.01) |

(52) U.S. Cl.
CPC ....... *G02B 27/0172* (2013.01); *G02B 5/0278* (2013.01); *G02B 27/017* (2013.01); *G02B 27/286* (2013.01); *G02B 5/1809* (2013.01); *G02B 5/3083* (2013.01); *G02B 2027/0118* (2013.01); *G02B 2027/0138* (2013.01)

(58) Field of Classification Search
CPC ...... G02B 5/0278; G02B 5/04; G02B 5/1809; G02B 5/3083; G02B 6/0001; G02B 27/0093; G02B 27/017; G02B 27/0172; G02B 27/0176; G02B 27/14; G02B 27/286; G02B 2027/0118; G02B 2027/0138; G02B 2027/014; G02B 2027/0161; G02B 2027/0169; G02B 2027/0178; G09G 5/14; G06F 3/1438; G06T 5/00
USPC .......... 359/630–632, 567; 345/7–9, 589, 633
See application file for complete search history.

(56) References Cited

U.S. PATENT DOCUMENTS

| | | | |
|---|---|---|---|
| 8,472,120 B2 * | 6/2013 | Border | G02B 27/0093 353/28 |
| 8,482,859 B2 * | 7/2013 | Border | G02B 27/017 353/28 |
| 8,488,246 B2 * | 7/2013 | Border | G02B 27/017 353/28 |
| 9,097,891 B2 * | 8/2015 | Border | G02B 27/0093 |
| 9,182,596 B2 * | 11/2015 | Border | G02B 27/0093 |

FOREIGN PATENT DOCUMENTS

| | | |
|---|---|---|
| JP | H06-51264 A | 2/1994 |
| JP | 2009-128649 A | 6/2009 |
| JP | 2012-163662 A | 8/2012 |

* cited by examiner

*Primary Examiner* — Loha Ben
(74) *Attorney, Agent, or Firm* — Oliff PLC

(57) ABSTRACT imagelight and outside light are viewed to overlap in a half mirror layer which is a semi-transmissive reflection unit from a state in which a polarization property of the outside light is canceled by a depolarization member disposed more outside than a light-guiding region of the imagelight.

13 Claims, 14 Drawing Sheets

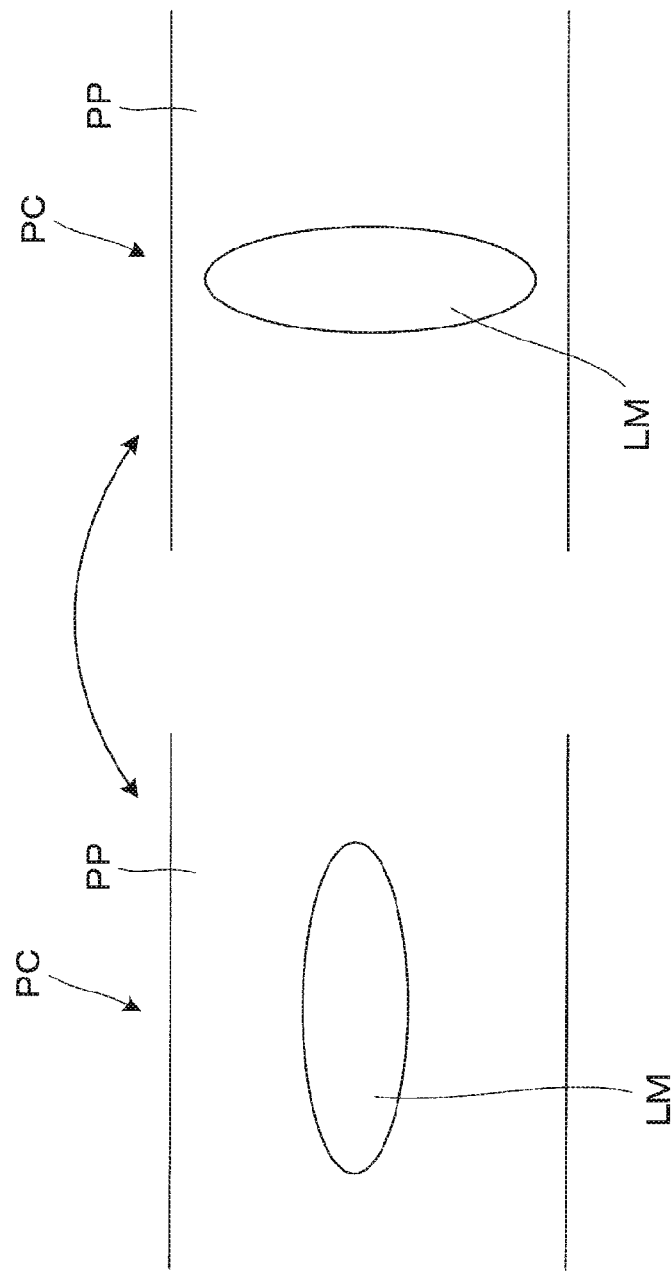

TRANSMISSIVE DISPLAY APPARATUS

BACKGROUND

1. Technical Field

The present invention relates to a light guiding device or the like guiding video light to present a video formed by an image display element or the like to an observer, and more particularly, to a transmissive display apparatus such as a virtual image display apparatus suitable for a head-mounted display mounted on the head of an observer.

2. Related Art

Various optical systems embedded in transmissive display apparatuses such as head-mounted displays (hereinafter also referred to as HMDs) mounted on heads of observers have been proposed (for example, see JP-A-2012-163662, JP-A-6-51264, and JP-A-2009-128649). For example, there is a known method of depolarizing guided video light by disposing a depolarization element on an optical path of the video light (see JP-A-2012-163662).

In transmissive display apparatuses configuring see-through optical systems superimposing such video light and outside light, light use efficiency can be improved, for example, when portions (combiner portions) superimposing the video light and the outside light are configured by films such as half mirrors with different transmission and a reflection property of P/S polarization (see JP-A-6-51264 and JP-A-2009-128649). However, there is a possibility of the outside light seen over the films such as the half mirrors being darkened or colored. In particular, when the outside light has a polarization property like image light from a liquid crystal panel or the like, the outside light is considered to be considerably darkened or colored.

SUMMARY

An advantage of some aspects of the invention is to provide a transmissive display apparatus enabling outside light having a polarization property to be viewed without considerable luminance deterioration or coloring even when a see-through optical system is configured using the fact that there is a difference in reflection and a transmission property in regard to polarization.

A transmissive display apparatus according to an aspect of the invention causes outside light and video light from a video element to be viewed to overlap. The transmissive display apparatus includes: a semi-transmissive reflection unit that performs partial reflection and transmission of the outside light and the video light while the outside light and the video light have a polarization property; and a depolarization member that is disposed in a region more outside than a light-guiding region of the video light extending from the video element to an eye assumption position assumed as a position of an eye via the semi-transmissive reflection unit, using the eye assumption position as a criterion, and cancels a polarization state of the outside light passing through the semi-transmissive reflection unit and incident on the eye assumption position. Here, the depolarization of the polarization state means a state (non-polarization state) in which there is no polarization, for example, when the outside light has a polarization property as in the image light from a liquid crystal panel or the like and when this polarization is overall averaged at random.

In the transmissive display apparatus, the video light and the outside light are viewed to overlap in the semi-transmissive reflection unit from the state in which the polarization property of the outside light is canceled by the depolarization member disposed more outside than the light-guiding region of the video light. Accordingly, even when the semi-transmissive reflection unit partially reflects and transmits the video light and the outside light while the video light and the outside light have the polarization property and the outside light has the polarization property, the light can be viewed without considerable luminance deterioration or coloring.

In a specific aspect of the invention, the transmissive display apparatus further includes a light-guiding member that guides the video light from the video element to the semi-transmissive reflection unit and emits the video light passing through the semi-transmissive reflection unit; and a light transmission member that is bonded to the light-guiding member via the semi-transmissive reflection unit and causes the video light and the outside light to be viewed to overlap in cooperation with the light-guiding member. The depolarization member is provided at a position at which the depolarization member is viewed to be superimposed on the semi-transmissive reflection unit from the eye assumption position. In this case, it is possible to reliably achieve the see-through in cooperation of the light-guiding member and the light transmission member, and the depolarization member can reliably cause the polarization state of a component of the outside light passing through the semi-transmissive reflection unit and reaching an eye of an observer to become the non-polarization before the light passes through the semi-transmissive reflection unit.

In another aspect of the invention, the depolarization member is provided to be superimposed on the semi-transmissive reflection unit on an outside of the light-guiding region of the video light. In this case, it is possible to reliably cancel the polarization property of the outside light immediately before the outside light is incident on the semi-transmissive reflection unit.

In still another aspect of the invention, the depolarization member is provided on a surface more outside the eye assumption position than the semi-transmissive reflection unit in a surface of a light-guiding device formed by the light-guiding member and the light transmission member. In this case, since the depolarization member may be provided on the surface side of the light-guiding device, it is easy to form the depolarization member.

In still another aspect of the invention, the transmissive display apparatus further includes a shade device that is fitted to screen at least a portion in front of the eye and has an outside light transmittance adjustment function to improve video visibility by lowering transmittance of the outside light. The depolarization member is provided in the shade device. In this case, the shade device can be allowed to have a depolarization function.

In still another aspect of the invention, the depolarization member is an electric optical element that temporally changes a refractive index through electric field driving. In this case, the electric optical element can perform adjustment so that the light reliably enters the non-polarization state.

In still another aspect of the invention, the depolarization member is a high phase difference film. In this case, it is possible to configure the depolarization member simply and reliably.

In still another aspect of the invention, a slow axis direction of the high phase difference film is a parallel direction or a vertical direction to a horizontal direction assumed as an eye arrangement direction. In this case, it is possible to perform appropriate depolarization on most of the outside light incident with the polarization property as in light from a liquid crystal panel.

In still another aspect of the invention, the depolarization member includes a random local orientation phase difference member that locally performs orientation in a different direction including a refractive index anisotropic material. In this case, the depolarization can be performed appropriately in accordance with a method of performing local orientation of the refractive index anisotropic material.

In still another aspect of the invention, the depolarization member is an adhesion member formed by admixing the refractive index anisotropic material in an adhesive. In this case, for example, in the light-guiding device including the light-guiding member and the light transmission member, the depolarization member can be provided in a spot in which light-guiding member and the light transmission member are adhered.

In still another aspect of the invention, the depolarization member is a diffraction element that includes a plurality of sub-wavelength gratings locally performing orientation in the different direction. In this case, by applying a different effect to each sub-wavelength grating, the diffraction element can have the depolarization function.

In still another aspect of the invention, the semi-transmissive reflection unit has a transmission property of 5% or more different polarization. In this case, for example, it is possible to adopt a semi-transmissive reflection unit with any of various configurations, such as a dielectric multi-layer film.

In still another aspect of the invention, the semi-transmissive reflection unit is a dielectric multi-layer film. In this case, the semi-transmissive reflection unit can transmit and reflect the light with high efficiency.

BRIEF DESCRIPTION OF THE DRAWINGS

The invention will be described with reference to the accompanying drawings, wherein like numbers reference like elements.

FIGS. 11A and 11B are diagrams conceptually illustrating a modification example of the structure of a depolarization member.

DESCRIPTION OF EXEMPLARY EMBODIMENTS

First Embodiment

Hereinafter, a transmissive display apparatus according to a first embodiment of the invention will be described in detail with reference to FIG. 1 and the like.

Figure 1:
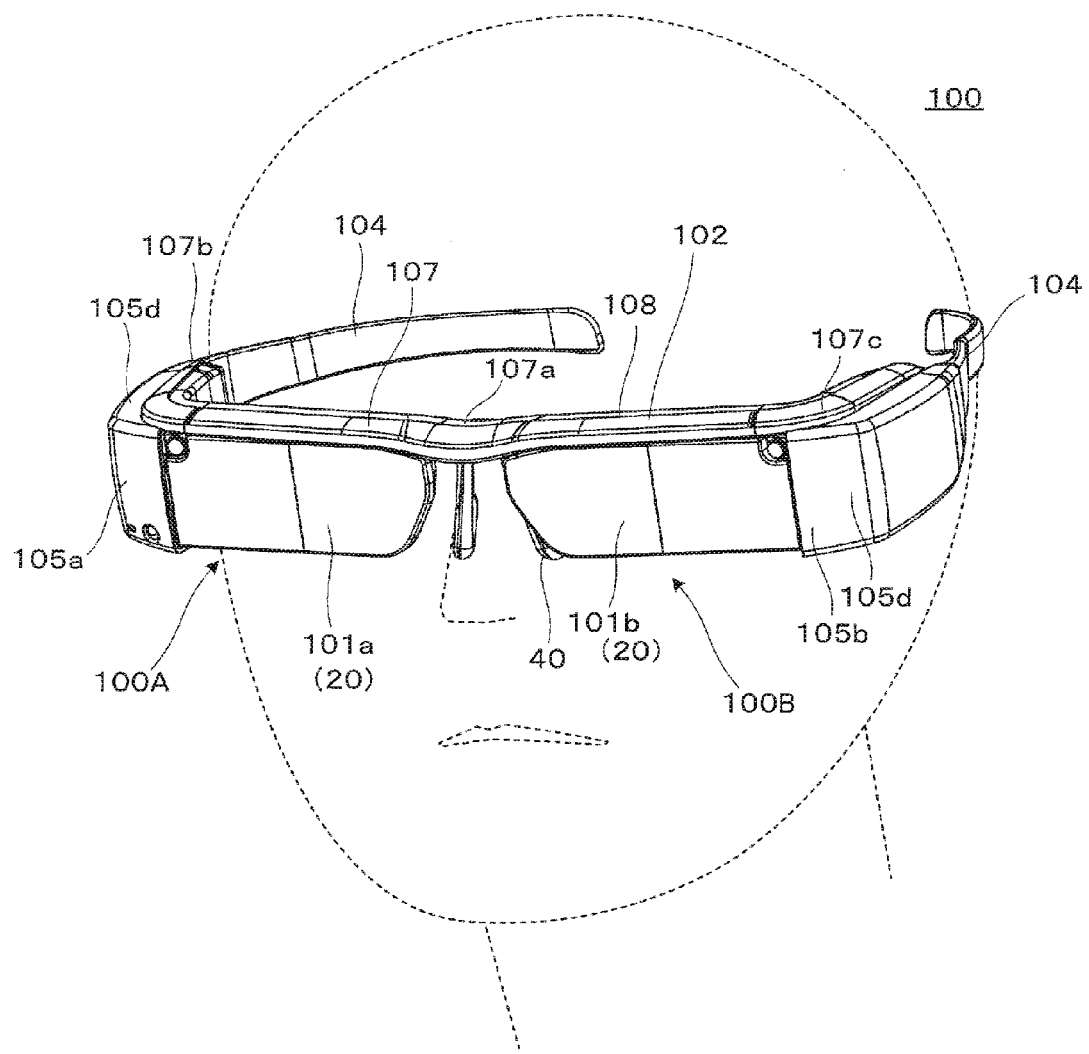
FIG. 1 is a perspective view illustrating simply the outer appearance of an example of a transmissive display apparatus according to a first embodiment.

As illustrated in FIG. 1, a transmissive display apparatus 100 according to the embodiment is a head-mounted display that has the same outer appearance as glasses, and is a virtual image display apparatus that enables an observer or a user mounting the transmissive display apparatus 100 to view image light (video light) as a virtual image and enables the observer to view or observe an outside image in a see-through manner. The transmissive display apparatus 100 includes first and second optical members 101a and 101b that screen the front of the observer so that the observer can see through the members, a frame unit 102 that supports both of the optical members 101a and 101b, and first and second image forming body units 105a and 105b that are added to portions extending from both ends of the frame unit 102 to temple portions 104 on the rear side. Here, a first display apparatus 100A in which the first optical member 101a and the first image forming body unit 105a on the left side of the drawing are combined is a portion that forms a right-eye virtual image and also functions as a transmissive display apparatus alone. Further, a second display apparatus 100B in which the second optical member 101b and the second image forming body unit 105b on the right side of the drawing are combined is a portion that forms a left-eye virtual image and also functions as a transmissive display apparatus alone. By comparing FIG. 2 to FIG. 1, the first and second image forming body units 105a and 105b are each configured by an image display apparatus 80 that includes a video display element (video element) 82 and a projection lens 30 accommodated in a column unit 39.

Figure 2:
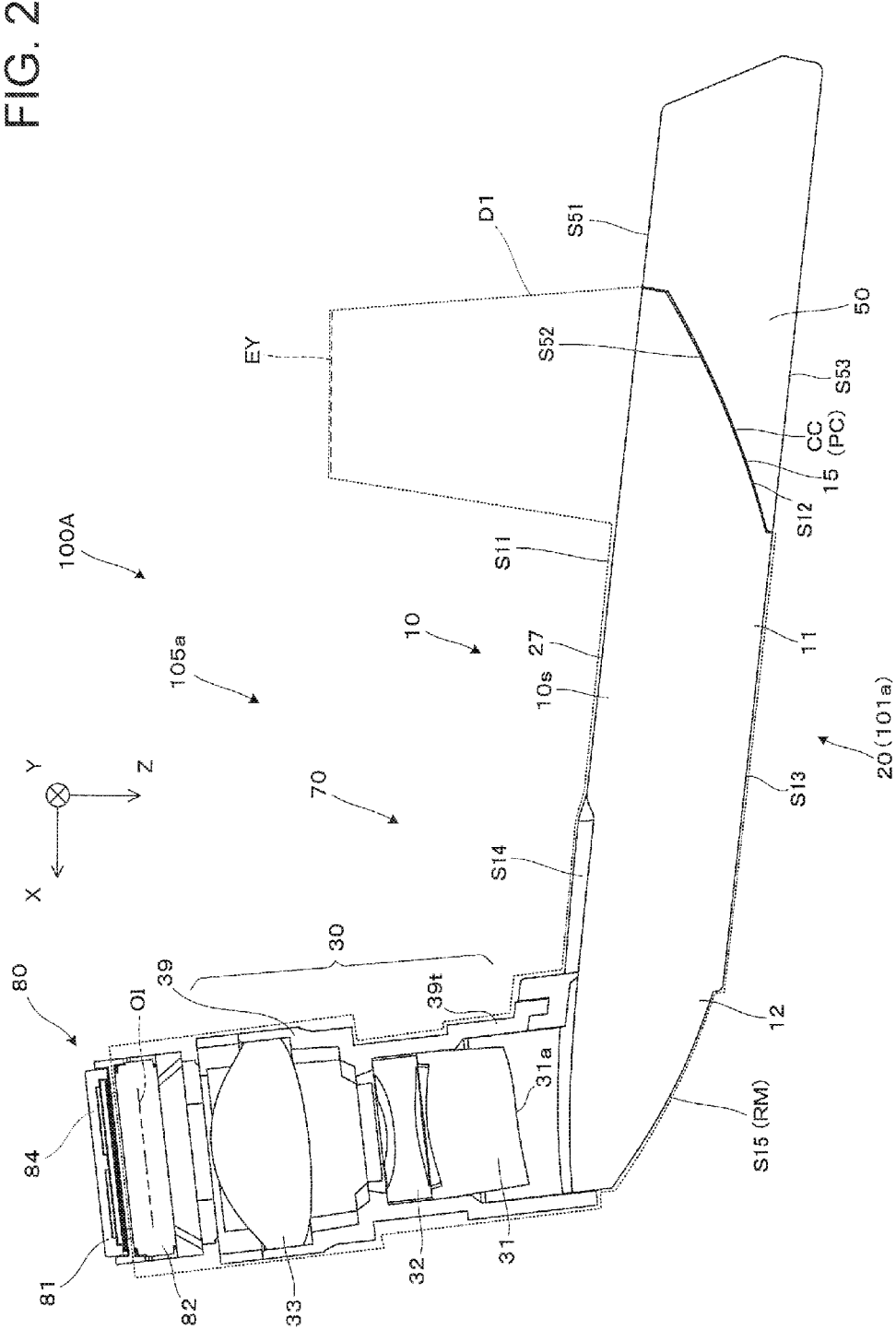
FIG. 2 is a sectional view illustrated a body of the transmissive display apparatus in a plan view.

As illustrated in FIGS. 1 and 2, the frame unit 102 provided in the transmissive display apparatus 100 includes a frame 107 disposed on the upper end side and a resin unit 108 disposed on the rear side along the frame 107. The transmissive display apparatus 100 has a configuration in which there is no frame-shaped portion on the lower side. The frame 107 included in the frame unit 102 is a member that has a slender plate shape bent in a U shape and includes a front surface portion 107a that extends in the right and left lateral directions (here referred to as a horizontal direction) which is a direction corresponding to the line of the eyes of the observer and a pair of side surface portions 107b and 107c that extend in a depth direction which is a direction corresponding to the front and rear sides of the observer. The frame 107, that is, the front surface portion 107a and the side surface portions 107b and 107c are metal integrated-components formed of aluminum die-cast or any of other various metal materials. The resin unit 108 is disposed along the frame 107 and is fitted with the frame 107 so that, for example, various cables or the like for forming an image can be accommodated in cooperation with the frame 107. A nose reception unit 40 is provided to be attached to the frame unit 102.

As illustrated in FIG. 2, the first display apparatus 100A can be considered to include a see-through projection apparatus 70 which is a projection optical system and an image display apparatus 80 that forms video light. The see-through projection apparatus 70 has a role of projecting an image formed by the image display apparatus 80 to the eyes of the observer as a virtual image. The see-through projection apparatus 70 includes the first optical member 101a or the light-guiding device 20 and the image-forming projection lens 30. The first optical member 101a or a light-guiding device 20 is configured to include a light-guiding and see-through light-guiding member 10 and a see-through light transmission member 50. The first image forming body unit 105a is configured to include the image display apparatus 80 and the projection lens 30.

The image display apparatus 80 includes not only a video display element (video element) 82 that is a transmissive spatial light modulation device but also a driving control unit 84 that controls an operation of, for example, the video display element 82 or an illumination device 81 which is a backlight emitting illumination light to the video display element 82.

As described above, the light-guiding device 20 is configured to include the light-guiding and see-through light-guiding member 10 and the see-through light transmission member 50. The light-guiding member 10 is a part of a prism type light-guiding device 20 and is an integrated member and can be regarded to be separated into a first light-guiding portion 11 of a light exit side and a second light-guiding portion 12 of a light incidence side. The light transmission member 50 is a member (assist optical block) that assists a see-through function of the light-guiding member 10 and serves as one light-guiding device 20 fixed to be integrated to the light-guiding member 10. In the light-guiding device 20 that has the foregoing configuration, a front end portion located on a light source side (base side) is fitted to an end 39t of the column unit 39 to be positioned and fixed to the projection lens 30 with high precision.

Hereinafter, an optical configuration of the transmissive display apparatus 100 will be described in detail with reference to FIG. 2. More specifically, the image display apparatus 80 and the projection lens 30 configuring the first image forming body unit 105a will be described in detail.

As described above, the image display apparatus 80 includes not only the video display element 82 but also the illumination device 81 that emits illumination light to the video display element 82, and the driving control unit 84 that controls operations of the illumination device 81 and the video display element 82. The illumination device 81 of the image display apparatus 80 includes a light source that generates light containing three red, green, and blue colors and a backlight light-guiding unit that diffuses light from the light source to form a rectangular cross-sectional light flux. The video display element (video element) 82 is formed as, for example, a liquid crystal device, is configured to include a plurality of pixels, and spatially modulates the illumination light from the illumination device 81 to form image light which is a display target such as a moving image. Although not illustrated, the driving control unit 84 is configured as a light source driving circuit that supplies power to the illumination device 81 and causes the illumination light with stable luminance to be emitted or a liquid crystal driving circuit that forms color video light or image light which is an origin of a moving image or a still image as a transmittance pattern by outputting an image signal or a driving signal to the video display element (video element) 82. The liquid crystal driving circuit can be configured to have an image processing function or an external control circuit can also be configured to have an image processing function.

The projection lens 30 is a projection optical system that includes three optical elements (lenses) 31 to 33 as constituent elements along an incidence side optical axis and is supported by the column unit 39 accommodating the optical elements 31 to 33. The optical elements 31 to 33 are aspherical lenses that include both of an asymmetric and aspherical surface (asymmetric aspherical surface) and a symmetric and aspherical surface (symmetric aspherical surface) and form an intermediate image corresponding to a display image of the video display element 82 inside the light-guiding member 10 in cooperation with a part of the light-guiding member 10. Of the lenses (optical elements) 31 to 33, a lens surface 31a which is a light emission surface of the first lens 31 is an asymmetric aspherical surface and lens surfaces other than the lens surface 31a are symmetric aspherical surfaces.

Hereinafter, the light-guiding device 20 and the like will be described in detail. As described above, the light-guiding device 20 is configured to include the light-guiding member 10 and the light transmission member 50. In the light-guiding member 10 of these members, a middle side (eye front side) portion close to a nose extends in a straight-line shape in a plan view. In the light-guiding member 10, the first light-guiding portion 11 disposed on the middle side close to the nose, that is, a light emission side, includes a first surface S11, a second surface S12, and a third surface S13 as side surfaces having an optical function and the second light-guiding portion 12 disposed on the peripheral side distant from the nose, that is, the light incidence side, includes a fourth surface S14 and a fifth surface S15 as side surfaces having an optical function. Of these surfaces, the first surface S11 and the fourth surface S14 are continuously adjacent, and the third surface S13 and the fifth surface S15 are continuously adjacent. The second surface S12 is disposed between the first surface S11 and the third surface S13, and the fourth surface S14 and the fifth surface S15 are adjacent at a large angle. Here, the first surface S11 and the third surface S13 disposed to face each other have mutually substantially parallel planar shapes. On the other hand, the other surfaces having the optical function, that is, the second surface S12, the fourth surface S14, and the fifth surface S15, are formed as asymmetric curved surfaces (free surfaces).

The light transmission member 50 serves as one light-guiding device 20 fixed to be integrated to the light-guiding member 10, as described above, and is a member (assist optical block) that assists a see-through function of the light-guiding member 10. The light transmission member includes a first transmission surface S51, a second transmission surface S52, and a third transmission surface S53 as side surfaces having an optical function. Here, the second transmission surface S52 is disposed between the first transmission surface S51 and the third transmission surface S53. The first transmission surface S51 is present on an extension surface of the first surface S11 of the light-guiding member 10, the second transmission surface S52 is a curved surface joined and integrated to the second surface S12 by an adhesion layer CC, and the third transmission surface S53 is present on an extension surface of the third surface S13 of the light-guiding member 10. Of these surfaces, the second transmission surface S52 and the second surface S12 of the light-guiding member 10 are integrated by joining through the thin adhesion layer CC, and therefore have substantially the same curvature.

Of the plurality of surfaces included in the light-guiding member 10, the surfaces S14 and S15 other than the surface from the first surface S11 to the third surface S13 include at least one point in which the sign of curvature differs in accordance with a direction with respect to at least one free curved surface. Thus, it is possible to miniaturize the light-guiding member 10 while controlling light-guiding of the video light with precision.

In the light-guiding member 10, a body 10s is formed of a resin material with high optical transparency in a visible range and is formed, for example, by injecting and solidifying a thermoplastic resin in a die. As the material of the body 10s, for example, a cyclo-olefin polymer can be used. The body 10s is an integrated product, but the light-guiding member 10 can be considered to be separated into the first light-guiding portion 11 and the second light-guiding portion 12 functionally, as described above. The first light-guiding portion 11 enables video light GL to be guided and emitted and enables outside light HL to be seen through (see FIG. 4 and the like). The second light-guiding portion 12 enables the video light GL to be incident and guided.

In the first light-guiding portion 11, the first surface S11 functions as a refractive surface emitting the video light GL outside the first light-guiding portion 11 and functions as a total reflection surface totally reflecting the video light GL on the inner surface side. The first surface S11 is disposed in front of an eye assumption position EY (hereinafter simply referred to as an eye EY since a case in which an eye is put at the eye assumption position EY is also included) assumed as the position of an eye and is formed in a planar shape, as described above. The first surface S11 is a surface that is formed by a hard coat layer 27 applied to the surface of the body 10s.

In the second surface S12, a half mirror layer 15 is attached to the surface of the body 10s. The half mirror layer 15 is not formed in the entire second surface S12, but is formed in a partial region (not illustrated) in which the second surface S12 is mainly narrowed in the vertical direction extending in the Y axis.

The third surface S13 functions as a total reflection surface that totally reflects the video light GL on the inner surface side. The third surface S13 is disposed substantially in front of the eye EY and is formed in a planar shape as in the first surface S11. The first surface S11 and the third surface S13 are mutually parallel surfaces. Therefore, when the outside light HL passes through the first surface S11 and the third surface S13 and is seen, eyepiece visibility is 0. In particular, variable magnification does not occur either. The third surface S13 is a surface that is formed by the hard coat layer 27 applied to the surface of the body 10s.

In the second light-guiding portion 12, the fourth surface S14 functions as a total reflection surface that totally reflects the video light GL on the inner surface side. The fourth surface S14 also functions as a refractive surface that allows the video light GL to be incident on the second light-guiding portion 12. That is, the fourth surface S14 functions not only as a light incidence surface that allows the video light GL to be incident on the light-guiding member 10 from the outside but also as a reflection surface that propagates the video light GL inside the light-guiding member 10. The fourth surface S14 is a surface that is formed by the hard coat layer 27 applied to the surface of the body 10s.

In the second light-guiding portion 12, the fifth surface S15 is formed by forming a light reflection film RM made of an inorganic material on the surface of the body 10s and functions as a reflection surface.

The light transmission member 50 exhibits high optical transparency in a visible range. The body of the light transmission member 50 is formed of a thermoplastic resin material having substantially the same refractive index as the body 10s of the light-guiding member 10. The light transmission member 50 is formed in such a manner that the body is joined to the body 10s of the light-guiding member 10 and subsequently a film is formed by hard coating along with the body 10s in the joined state. That is, the hard coat layer is applied to the surface of the body of the light transmission member 50, as in the light-guiding member 10. The first transmission surface S51 and the third transmission surface S53 are surfaces that are formed by the hard coat layer 27 applied to the surface of the body.

The light-guiding device 20 is formed by joining a base material to become the light-guiding member 10 and the light transmission member 50 by a joining portion CN, and then coating the joined base material through a dipping process. That is, the hard coat layer 27 of the light-guiding member 10 is provided in the entire light-guiding device 20 along with the light transmission member 50.

Figure 4:
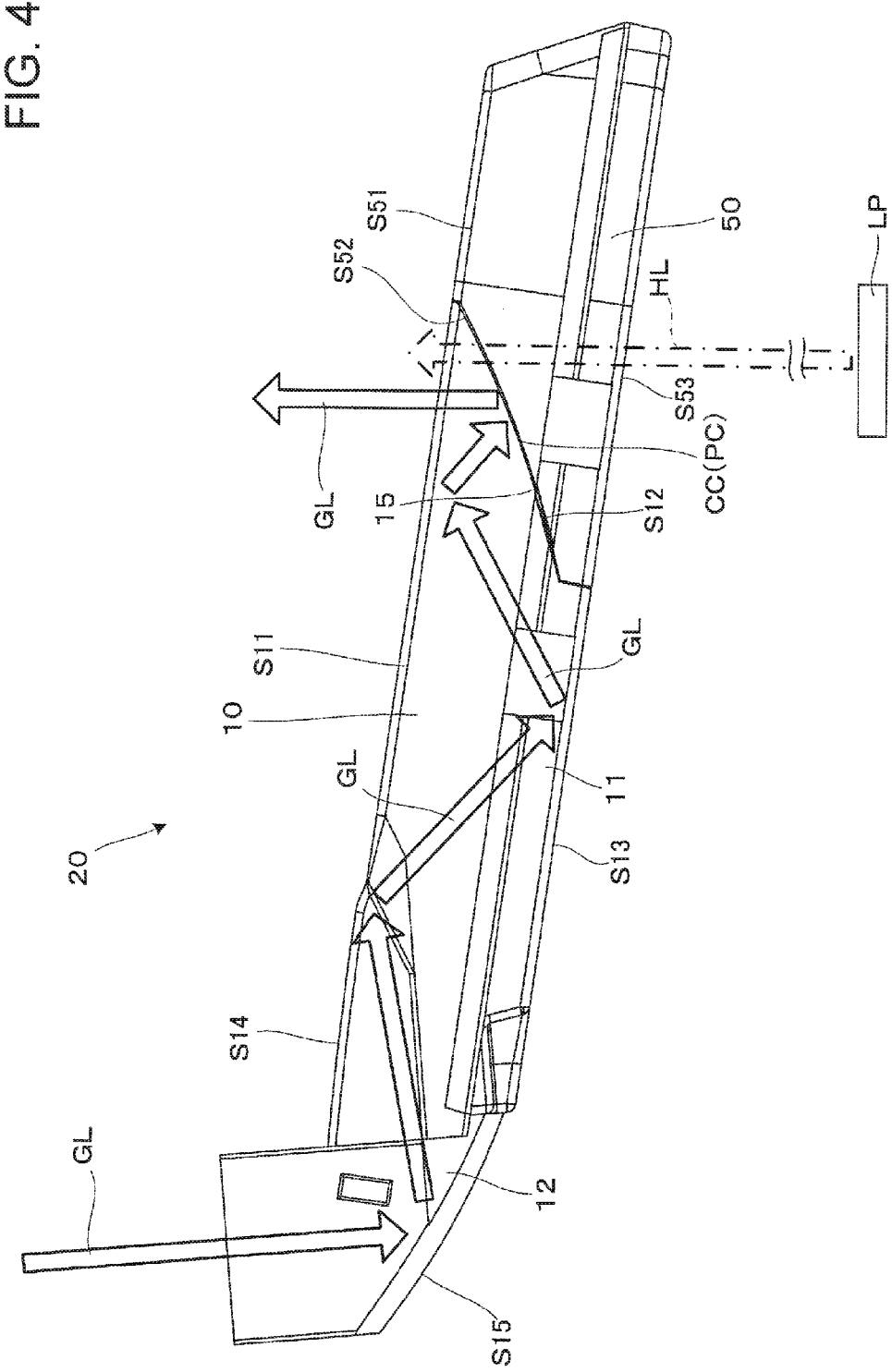
FIG. 4 is a diagram illustrating an example of a form of superimposition of video light and outside light.
Figure 6:
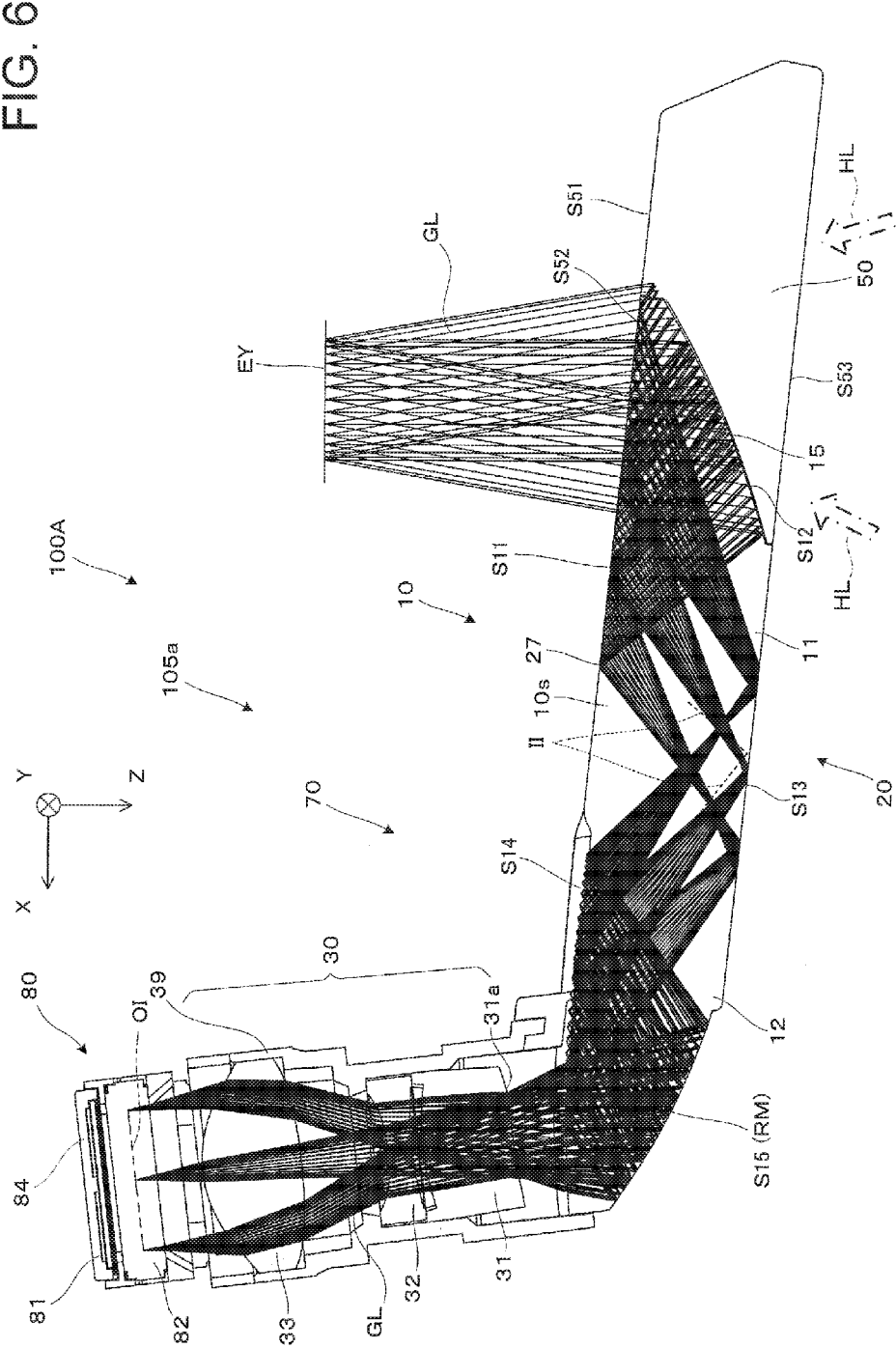
FIG. 6 is a diagram illustrating an optical path of the video light in the transmissive display apparatus.

In the embodiment, as described above, the video light from the video display element 82 is guided by reflection of five times from the first surface S11 to the fifth surface S15, including total reflection of at least two times inside the light-guiding member 10 (see FIG. 4 or 6). Thus, the display of the video light GL and see-through of viewing the outside light HL can be caused to be compatible and aberration of the video light GL can be corrected.

Figure 3:
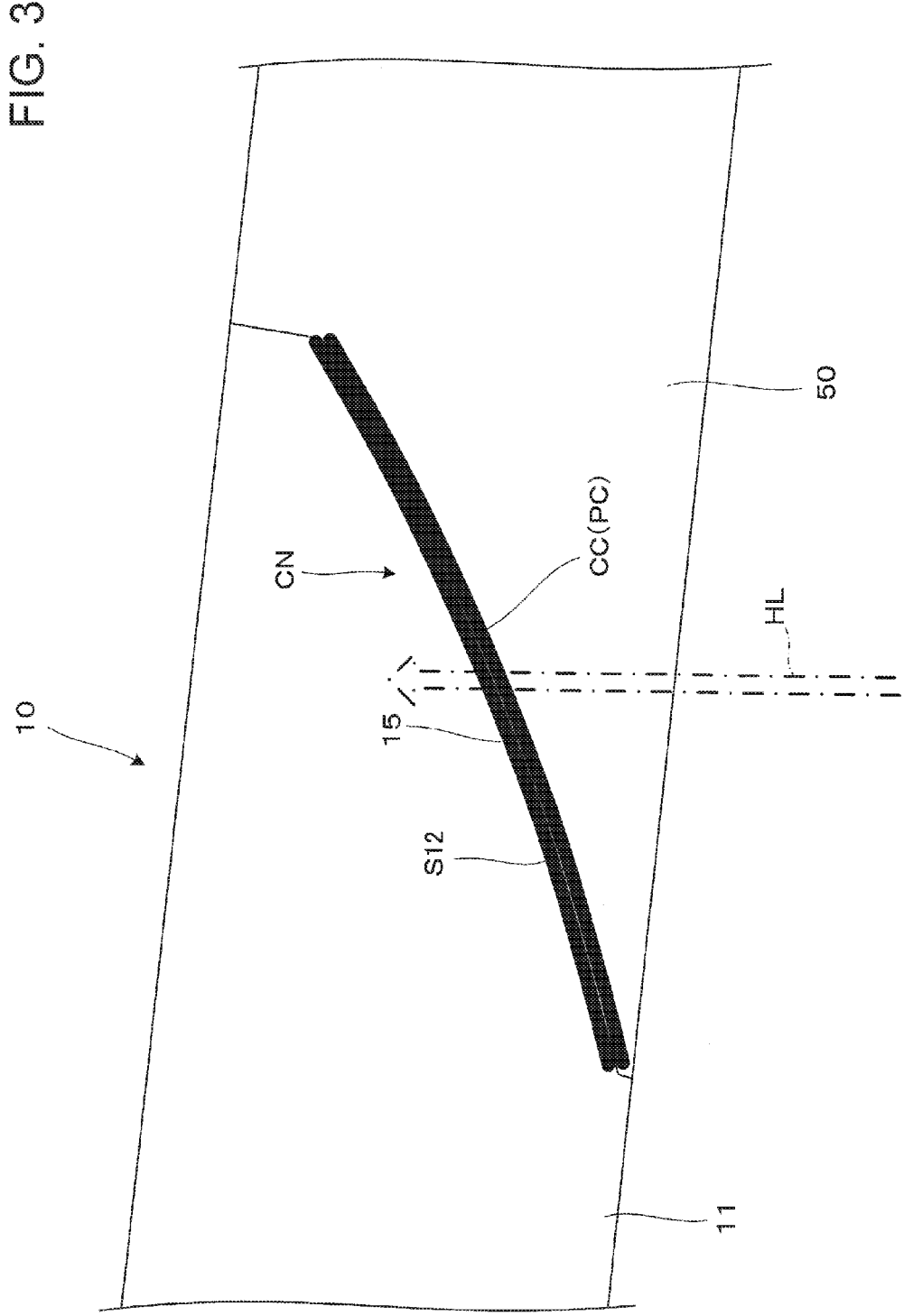
FIG. 3 is a diagram conceptually illustrating the structure of a semi-transmissive reflection unit and a depolarization member in FIG. 2.

In the embodiment, as described above and as conceptually indicated in FIG. 3, the half mirror layer 15 is attached at the position of the second surface S12 of the light-guiding member 10 in the joining spot of the light-guiding member 10 and the light transmission member 50 in the light-guiding device 20. Further, the light transmission member 50 is joined via the adhesion layer CC in the spot in which the half mirror layer 15 is provided in the light-guiding member 10. In other words, the light-guiding member 10 and the light transmission member 50 are bonded to interpose the half mirror layer 15 which is a semi-transmissive reflection unit in cooperation. As a result, the adhesion layer CC is provided to be superimposed on the outer side (outside) of the half mirror layer 15. The joining surface of the light-guiding member 10 and the light transmission member 50 and a portion configured by the adhesion layer CC are referred to as the joining portion CN.

In the joining portion CN, the half mirror layer 15 is a semi-transmissive reflection unit that is formed by forming a dielectric multi-layer film on a partial region of the backing surface of the body 10s of the light-guiding member 10. The adhesion layer CC is an adhesion member that is formed by admixing a random local orientation phase difference member locally performing orientation in a different direction in an adhesive in addition to a refractive index anisotropic material and functions as a depolarization member PC that is a depolarization unit cancelling a polarization state of light.

For example, as illustrated in FIG. 4, the half mirror layer 15 is configured as a dielectric multi-layer film that partially reflects the video light GL guided inside the light-guiding device 20 and emitted and transmits the outside light HL passing through the light-guiding device 20 to function as a semi-transmissive reflection unit. Accordingly, since the outside light HL incident on the half mirror layer 15 is partially reflected while being partially transmitted through the half mirror layer 15, the outside light HL in a direction corresponding to the half mirror layer 15 can be weakened according to transmittance of the half mirror layer 15. On the other hand, since the video light GL is incident in the direction corresponding to the half mirror layer 15, the observer observes an outside image along with an image formed on the video display element (video element) 82 in the direction of the half mirror layer 15.

The foregoing half mirror layer 15 is configured by a dielectric multi-layer film to perform transmission and reflection of light with high efficiency. However, on the other hand, when the half mirror layer 15 is configured by a dielectric multi-layer film, it is easy for the half mirror layer 15 to have a polarization property. For example, when the half mirror layer 15 is assumed to be formed by a dielectric multi-layer film having a transmission property of 5% or more different polarization before and after passage of polarized light, the outside light HL transmitted through the half mirror layer 15 considerably receives an influence of the polarization property of the half mirror layer 15. When the outside light HL is light in a polarized state, the light is considerably darkened or colored due to the transmission of the half mirror layer 15, and thus there is a possibility of the light reaching the eyes of the observer. In the embodiment, however, this situation is avoided by providing the depolarization member PC so that the depolarization member PC is superimposed on the half mirror layer 15 which is the semi-transmissive reflection unit outside a light-guiding region of the video light GL. Specifically, when the adhesion layer CC located outside the half mirror layer 15 includes the foregoing random local orientation phase difference member, the adhesion layer CC functions as the depolarization member PC that causes polarization of the outside light HL to be in a random state. In the above case, the depolarization member PC can be said to be provided at a position at which the depolarization member PC is viewed to be superimposed with the half mirror layer 15 which is the semi-transmissive reflection unit when the video light GL and the external light HL are viewed to overlap from the eye assumption position EY.

Figure 5:
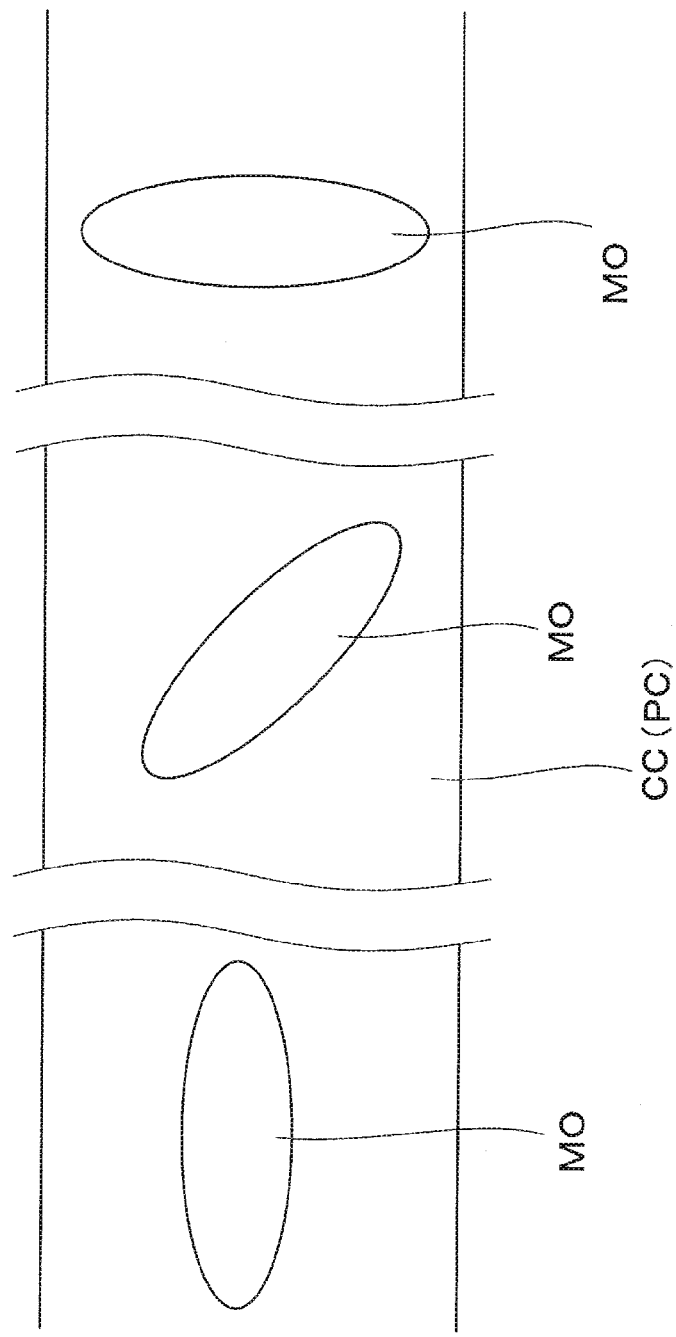
FIG. 5 is a diagram conceptually illustrating an example of the structure of the depolarization member.

The random local orientation phase difference member included in the adhesion layer CC locally performs orientation in different directions in an adhesive in addition to a refractive index anisotropic material. More specifically, as illustrated in FIG. 5, the random local orientation phase difference member can orient a molecule MO having refractive index anisotropy in a different direction depending on a position as in, for example, liquid crystal to cause the molecule MO in a different polarized state at each position. Accordingly, when averaging is performed by spatially superimposing the light passing through the adhesion layer CC, the light enters substantially the same state as non-polarization. When light enters a different polarized state at each position, light scattering is suppressed to the utmost by aligning the molecule MO in the same direction within a certain local range, and then the light can enter substantially the same state as non-polarization as a whole. The adhesion layer CC includes a material having such a nature. The outside light HL illustrated in FIG. 3 or 4 enters substantially the same state as non-polarization when the outside light HL passes through the adhesion layer CC, and then the outside light HL is transmitted through the half mirror layer 15 which is the semi-transmissive reflection unit. Accordingly, even when the half mirror layer 15 partially reflects and transmits the video light and the outside light while causing the light to have a polarization property and the outside light HL has a polarization property emitted from a liquid crystal pane LP, as exemplified in FIG. 4, the outside light HL can be viewed without considerable luminance deterioration or coloring of the outside light HL.

As described above, in the embodiment, the adhesion layer CC provided to be superimposed on the semi-transmissive reflection unit outside the light-guiding region of the video light GL functions as the depolarization member PC. In other words, in the transmissive display apparatus 100, the joining portion CN has the adhesion layer CC including the random local orientation phase difference member as a depolarization mechanism (depolarization unit). Accordingly, a polarization state of the outside light HL can be set to non-polarization before the outside light HL passes through the half mirror layer 15 which is the semi-transmissive reflection unit. From another viewpoint, the adhesion layer CC is disposed on the more distant side than a light-guide region D1, in which the video light GL reaches from the video display element (video element) 82 to the eye assumption position EY assumed as the position of an eye via the half mirror layer 15 which is the semi-transmissive reflection unit, from the eye assumption position EY, that is, on the outside of the eye assumption position EY. Thus, the adhesion layer CC can function as the depolarization member PC that cancels a polarization state of outside light passing through the half mirror layer 15 (semi-transmissive reflection unit) and incident on the eye assumption position EY. Accordingly, the foregoing problem can be said to be resolved. In the foregoing case, a base material of assembly of the light-guiding device 20 can have a depolarization function, and thus a manufacturing process can also be simplified.

Hereinafter, an optical path of the video light GL or the like in the transmissive display apparatus 100 will be described more specifically with reference to FIG. 6. The video light GL emitted from the video display element (video element) 82 passes through the lenses 31 to 33 included in the projection lens 30 and an expected astigmatism is given while the video light GL converges, and the video light GL is incident on the fourth surface S14 with a positive refractive power included in the light-guiding member 10. The astigmatism is offset while the light goes through each of the surfaces of the light-guiding member 10, and then the video light is finally emitted toward the eyes of the observer in an initial state.

The video light GL incident and passing through the fourth surface S14 of the light-guiding member 10 travels while the video light GL converges. When the video light GL goes via the second light-guiding portion 12, the video light GL is reflected by the fifth surface S15 with a relatively weak and positive refractive power and is incident again and reflected by the fourth surface S14 from the inside.

The video light GL reflected by the fourth surface S14 of the second light-guiding portion 12 is incident and totally reflected by the third surface S13 substantially having no refractive power and is incident and totally reflected by the first surface S11 substantially having no refractive power in the first light-guiding portion 11.

Here, the video light GL forms an intermediate image in the light-guiding member 10 before and after the video light GL goes through the third surface S13. An image surface II of the intermediate image corresponds to an image surface OI of the video display element 82.

The video light GL totally reflected by the first surface S11 is incident on the second surface S12. In particular, the video light GL incident on the half mirror layer 15 is partially transmitted through the half mirror layer 15 and is partially reflected, and is also incident again on the first surface S11 to pass therethrough. The half mirror layer 15 has an operation of a relatively strong and positive refractive power on the video light GL reflected by the half mirror layer 15. The first surface S11 has an operation of no refractive power on the video light GL passing through the first surface S11.

The video light GL passing through the first surface S11 is incident as a substantially parallel light flux on the pupil of the eye EY of the observer or its equivalent position. That is, the observer observers an image formed on the video display element (video element) 82 by the video light GL as a virtual image.

On the other hand, of the outside light HL, the light incident on the +X side of the second surface S12 of the light-guiding member 10 passes through the third surface S13 and the first surface S11 of the first light-guiding portion 11. At this time, since the third surface S13 and the first surface S11 are mutually substantially parallel planes, aberration rarely occurs. That is, the observer observes an outside image with no distortion beyond the light-guiding member 10. Similarly, when light incident on the −X side of the second surface S12 of the light-guiding member 10, that is, light incident on the light transmission member 50, in the external light HL passes through the third transmission surface S53 and the first transmission surface S51 included in the light transmission member 50, aberration or the like does not occur because of the fact that the third transmission surface S53 and the first transmission surface S51 are mutually substantially parallel planes. That is, the observer observes an outside image with no distortion beyond the light transmission member 50. Further, when light incident on the light transmission member 50 corresponding to the second surface S12 of the light-guiding member 10 in the outside light HL passes through the third transmission surface S53 and the first surface S11, aberration or the like rarely occurs because of the fact that the third transmission surface S53 and the first surface S11 are mutually substantially parallel planes. That is, the observer observes an outside image with small distortion beyond the light transmission member 50. The second surface S12 of the light-guiding member 10 and the second transmission surface S52 of the light transmission member 50 have substantially the same curved surface shape and substantially the same refractive index, and a gap between both of the second surface S12 and the second transmission surface S52 is filled with the adhesion layer CC with substantially the same refractive index. That is, the second surface S12 of the light-guiding member 10 or the second transmission surface S52 of the light transmission member 50 does not operate as a refractive surface on the outside light HL.

As described above, in the transmissive display apparatus 100 according to the embodiment, the video light GL and the outside light HL are viewed to overlap in the half mirror layer 15 which is the semi-transmissive reflection unit from the state in which the polarization property of the outside light HL is canceled by the adhesion layer CC which is the depolarization member PC disposed more outside than the region D1 which is the light-guiding region of the video light GL. Then, even when the half mirror layer 15 partially reflects and transmits the video light GL and the outside light HL while the video light GL and the outside light HL have the same polarization property as a dielectric multi-layer film and the outside light HL has the polarization property, the light can be viewed without considerable luminance deterioration or coloring.

Second Embodiment

Hereinafter, a transmissive display apparatus according to a second embodiment will be described. The embodiment is a modification example of the transmissive display apparatus according to the first embodiment and portions and matters not particularly described are the same as those of the first embodiment.

Figure 7:
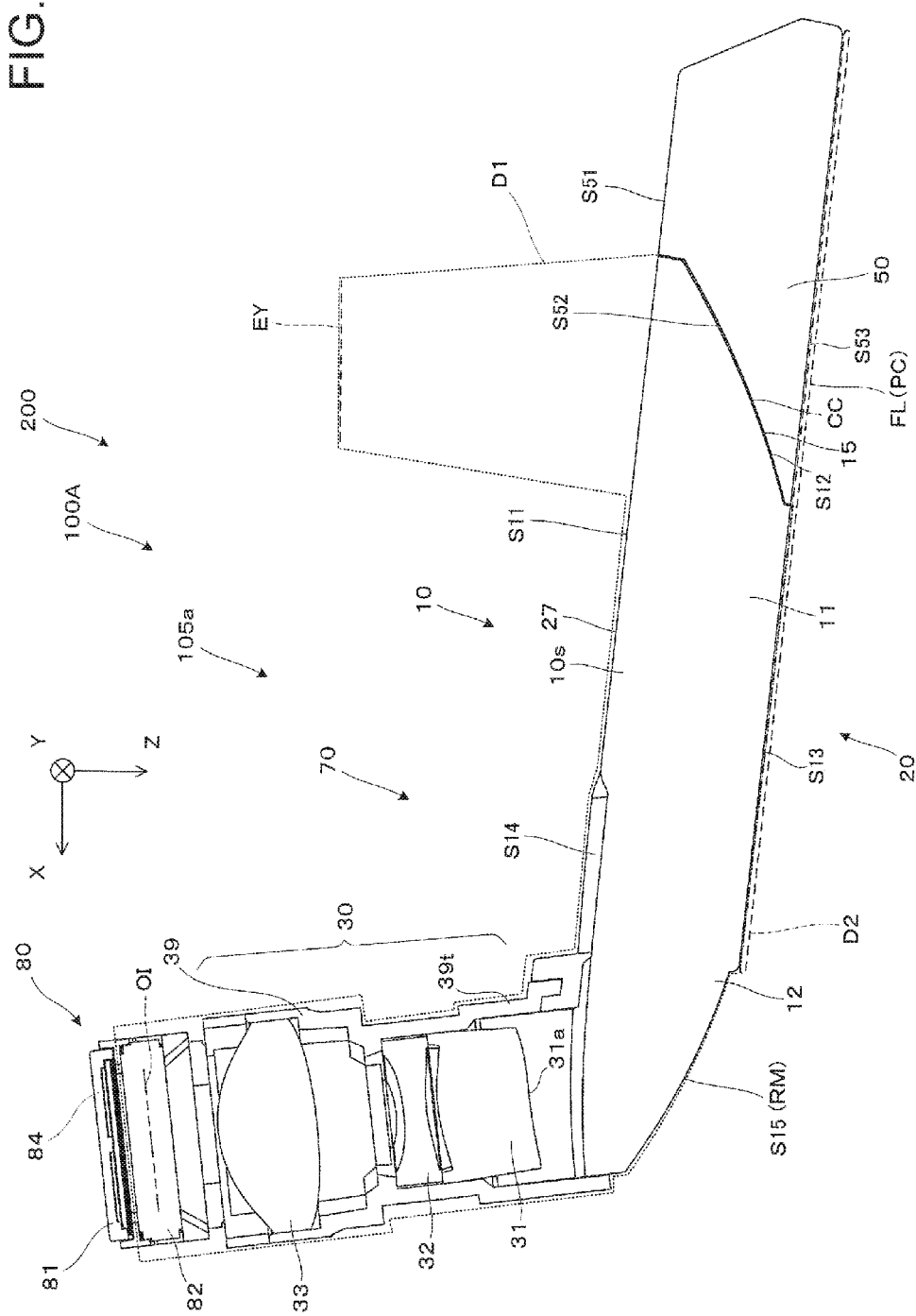
FIG. 7 is a sectional view illustrating a transmissive display apparatus in a plan view according to a second embodiment.

FIG. 7 is a sectional view illustrated the transmissive display apparatus in a plan view according to the second embodiment and is a diagram corresponding to FIG. 2 of the first embodiment.

As illustrated in FIG. 7, in a transmissive display apparatus 200 according to the embodiment, the structure of a depolarization member PC which is a depolarization unit is different from transmissive display apparatus of the first embodiment illustrated in FIG. 1 and the like. More specifically, in the embodiment, as illustrated in FIG. 7, the depolarization member PC is not the adhesion layer CC, but is a member (film forming layer FL) formed in a region D2 which is the surface more outside than the half mirror layer 15 which is a semi-transmissive reflection unit and is a region near this surface using an eye assumption position EY as a criterion in the surface of the light-guiding device 20 formed by the light-guiding member 10 and the light transmission member 50. In other words, the region D2 is a region which is a range in which outside light is incident and extends from the third surface S13 of the light-guiding member 10 to the third transmission surface S53 of the light transmission member 50 and a region near this region in the surface of the light-guiding device 20, so to speak, a region on the outer surface side of the light-guiding device 20. By providing the film forming layer FL as the depolarization member PC within the region D2, it is possible to reliably cause outside light passing through the light-guiding device 20 and incident on the eye assumption position EY to enter a non-polarization state. The region D2 is a region on a more distant side than a light-guiding region (a region in which the video light GL reaches from the video display element 82 to the eye assumption position EY via the half mirror layer 15 which is the semi-transmissive reflection unit) from the eye assumption position EY, that is, on the outside of the eye assumption position EY.

Here, for the depolarization member PC according to the embodiment, for example, not only a method of forming the film forming layer FL by applying the same random local orientation phase difference member as the first embodiment to the region D2 but also a method of pasting a high phase difference film corresponding to the film forming layer FL can be applied. In either case, a process is assumed to be appropriately performed so that there is no influence on the guiding of the video light GL in the third surface S13.

The high phase difference film included in the depolarization member PC has a different optical length between a high refractive index axis and a low refractive index axis and has a refractive index distribution different also depending on each wavelength. Accordingly, light passing through the high phase difference film enters a different polarization state for each wavelength. By superimposing the light passing through the high phase difference film, it is possible to cause the light to enter a substantial non-polarization state as a whole. Here, when there is a possibility of coloring being viewed when viewed through a polarization plate depending on a film condition or the like, a film with an appropriate condition in accordance with an emission polarization direction or the like is considered to be selected. An example of the high phase difference film is a PET film.

In the embodiment, the slow axis direction of the high phase difference film included in the depolarization member PC is a parallel direction or a vertical direction to the horizontal direction (lateral direction) assumed as an eye arrangement direction. For example, in many display apparatuses emitting polarized light, such as liquid crystal panels generally used in the world, polarization directions of emitted light are oriented in inclination directions. Therefore, for depolarization in the high phase difference film, the high phase difference film is disposed in a direction in which the slow axis is inclined at 45°, that is, the horizontal direction or the vertical direction. Then, light emitted from a liquid crystal panel or the like and recognized as outside light by an observer can be appropriately depolarized in the depolarization member PC.

When a random local orientation material is used for the depolarization member PC, as described in the first embodiment, the random local orientation material can be admixed in an adhesive. Therefore, for example, when the depolarization member PC is provided on the surface of the light-guiding device 20 as in the embodiment, a material in which the material is admixed in an adhesive of a film with a hard coat function can also be used. Accordingly, it is possible to have both of the hard coat function and the depolarization function.

Figure 8:
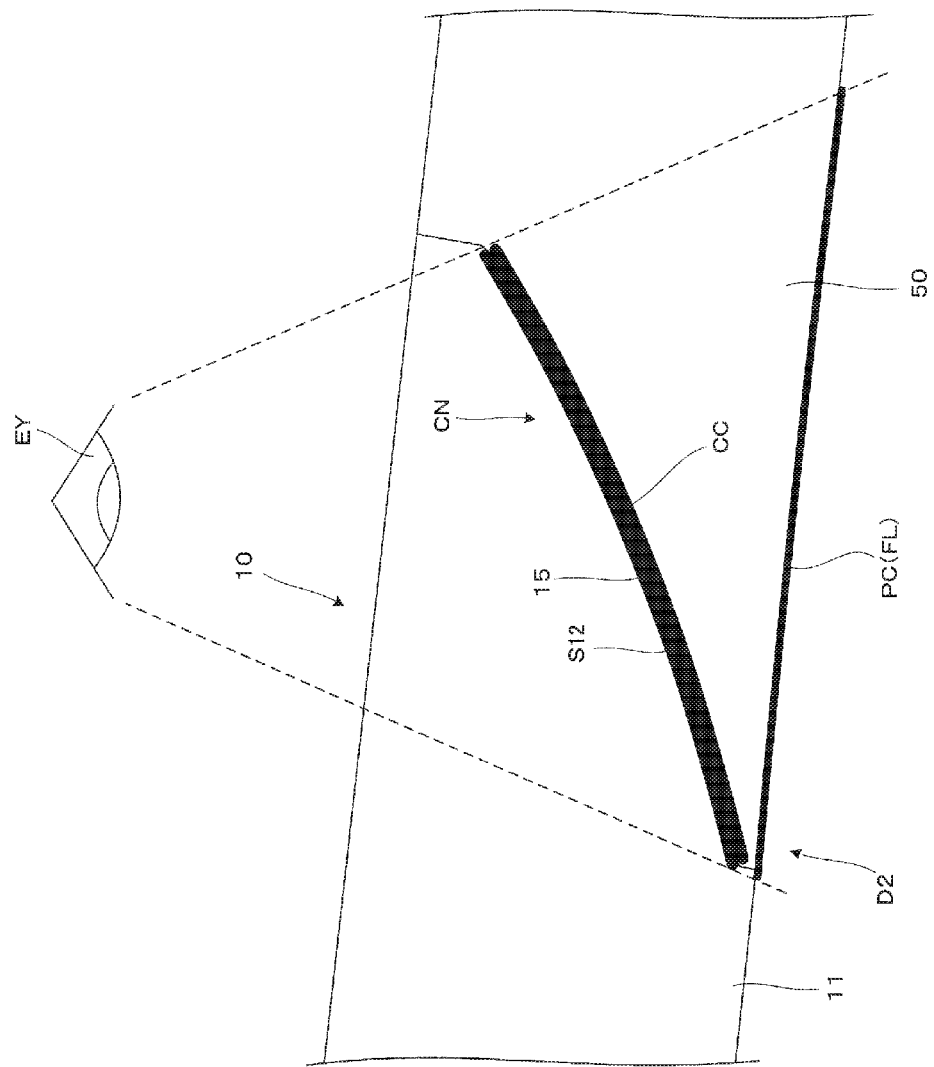
FIG. 8 is a view illustrating a modification example of a transmissive display apparatus according to the second embodiment.

FIG. 8 is a view illustrated a modification example of a transmissive display apparatus according to the embodiment. In the example of FIG. 7, the depolarization member PC formed by the film forming layer FL or the like is applied to the entire front surface side corresponding to the range extending from the third surface S13 to the third transmission surface S53 in the region D2. However, as illustrated in FIG. 8, the depolarization member PC may also be applied to only a range corresponding to the half mirror layer 15 which is a semi-transmissive reflection unit in the region D2. More specifically, as illustrated, the depolarization member PC is provided in a range in which the depolarization member PC is viewed to be superimposed with the half mirror layer 15 when the video light and the outside light are viewed to overlap from the position of an eye EY. Then, it is possible to cause a component of the outside light passing through the half mirror layer 15 to enter a non-polarization state in advance, and thus it is possible to achieve an expected goal.

In the embodiment, from the state in which the polarization property of the outside light HL is canceled by the depolarization member PC such as the film forming layer FL serving as a depolarization mechanism (depolarization unit), the video light GL and the outside light HL are viewed to overlap in the half mirror layer 15 which is the semi-transmissive reflection unit. Then, even when the half mirror layer 15 partially reflects and transmits the video light GL and the outside light HL while causing the light to have a polarization property, as in a dielectric multi-layer film, and the outside light HL has the polarization property, the light can be viewed without considerable luminance deterioration or coloring.

Third Embodiment

Hereinafter, a transmissive display apparatus according to a third embodiment will be described. The embodiment is a modification example of the transmissive display apparatus according to the first embodiment and portions and matters not particularly described are the same as those of the first embodiment.

Figure 9:
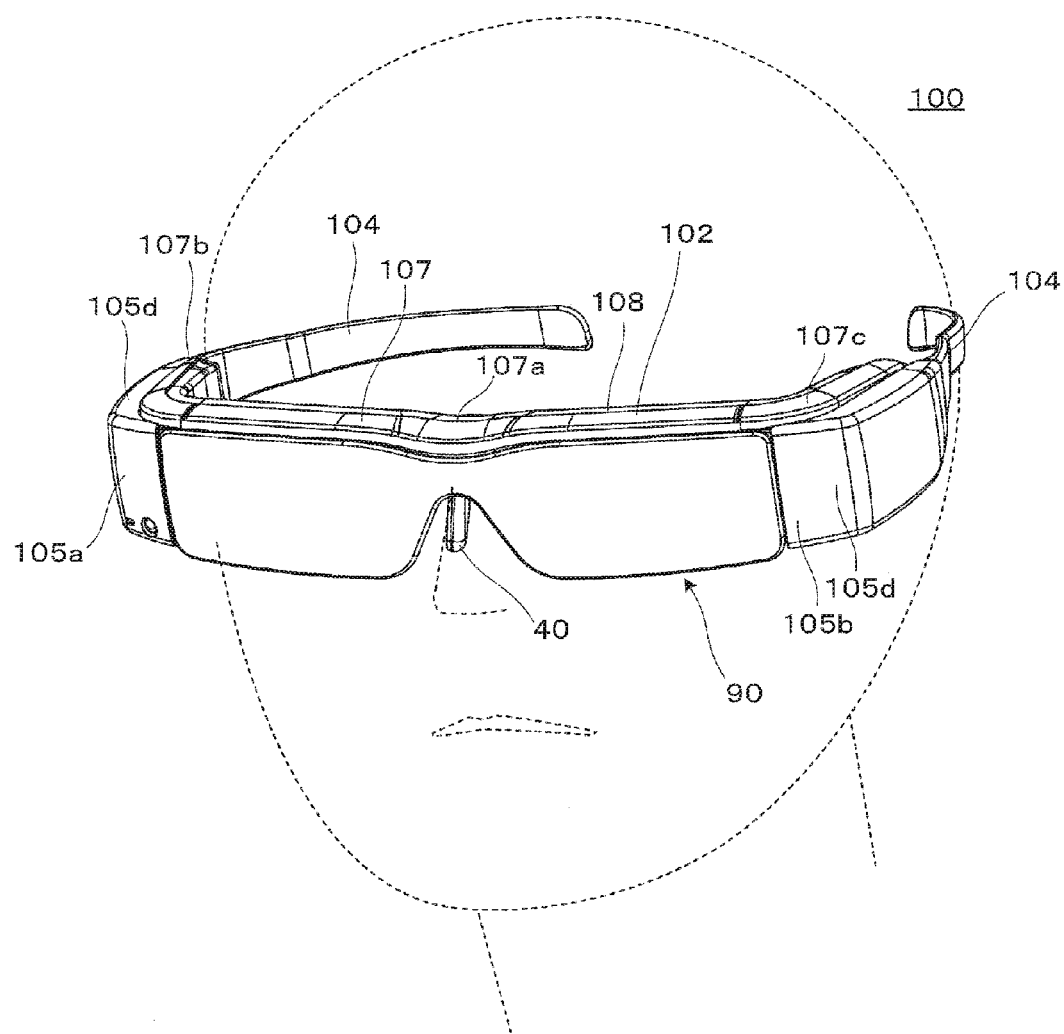
FIG. 9 is a perspective view simply illustrating the outer appearance of an example of a transmissive display apparatus according to a third embodiment.
Figure 10:
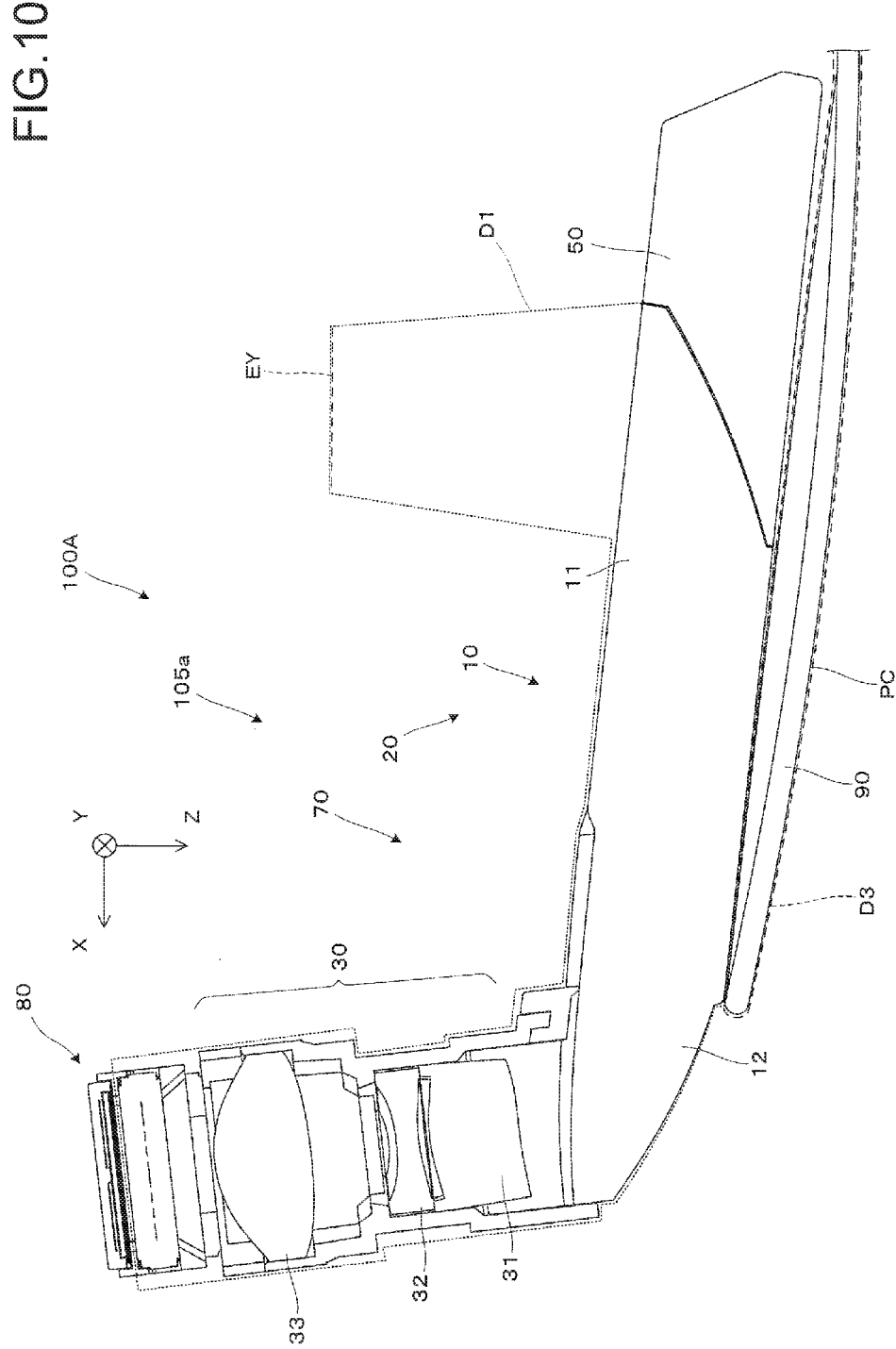
FIG. 10 is a sectional view illustrating a transmissive display apparatus in a plan view according to a third embodiment.

FIG. 9 is a perspective view simply illustrating the outer appearance of an example of a transmissive display apparatus according to the third embodiment and is a diagram corresponding to FIG. 1 of the first embodiment. FIG. 10 is a sectional view illustrated the transmissive display apparatus in a plan view according to the third embodiment and is a diagram corresponding to FIG. 2 and the like of the first embodiment.

As illustrated in FIGS. 9 and 10, a transmissive display apparatus 300 according to the embodiment is configured such that a shade device 90 which is a flexible member formed of a resin material or the like having a light-shielding property or a light-absorbing property can be mounted. That is, the transmissive display apparatus 300 is configured such that the shade device 90 can be detachably mounted, and thus an outside visual field can be adjusted in regard to see-through. In other words, the transmissive display apparatus 300 further includes the shade device 90 that is mounted to screen portions in front of eyes and has an outside light transmittance adjustment function to improve video visibility by lowering the transmittance of outside light. When the shade device 90 is detached, the state is the same as the state of FIG. 1. Therefore, the illustration and description will be omitted.

In the embodiment, as illustrated in FIG. 10, the transmissive display apparatus is different from the transmissive display apparatus of the other embodiments in that the depolarization member PC is provided in the shade device 90 rather than the adhesion layer CC or the surface of the light-guiding device 20. More specifically, in the embodiment, the depolarization member PC is provided in a region D3 occupied by the shade device 90 when the shade device 90 is mounted. Here, for example, the depolarization member PC is assumed to be formed on the outer surface of the surface of the shade device 90. By providing the depolarization member PC in the region D3, it is possible to reliably cause outside light passing through the light-guiding device 20 and incident on the eye assumption position EY to enter a non-polarization state. The region D3 is a region more outside than the light-guiding region (a region in which the video light GL reaches from the video display element 82 to the eye assumption position EY via the half mirror layer 15 which is the semi-transmissive reflection unit) from the eye assumption position EY, that is, on the outside of the eye assumption position EY.

The shade device 90 may be configured to have an electronic shutter function of adjusting transmittance by blocking outside light using liquid crystal as well as the foregoing function.

Here, for the depolarization member PC according to the embodiment, for example, a method of pasting a high phase difference film can also be applied as well as the method of applying the random local orientation phase difference member to the region D3 as in the case of the first embodiment. The invention is not limited to the case in which the depolarization member PC is applied to the entire front surface side, but the depolarization member PC may be provided in a range in which the depolarization member PC is viewed to overlap with the half mirror layer 15 when the video light and the external light are viewed to overlap from the position of an eye EY.

Others

The invention has been described according to the embodiments, but the invention is not limited to the foregoing embodiments and can be realized in various forms within the range of the invention without departing from the gist of the invention. For example, when the depolarization member PC can be realized in various forms and the achievement of the see-through can be maintained, a high phase difference film may be used instead of the random local orientation phase difference member in the first embodiment. In regard to the spot in which the depolarization member PC is provided in each embodiment, the depolarization members PC may be provided in a plurality of spots (for example, the depolarization members PC are provided in both of the adhesion layer CC and the region D2). The depolarization member PC can be modified as follows, for example.

FIGS. 11A and 11B are conceptual diagrams illustrating a modification example of the structure of a depolarization member. Here, an electric optical element that temporally changes a refractive index through electric field driving is assumed to be used as the depolarization member PC. More specifically, the depolarization member PC is configured with a liquid crystal panel PP in which liquid crystal molecules LM with refractive index anisotropy are arrayed. By applying a high-frequency electric field in the liquid crystal panel PP to temporally change the posture of the liquid crystal molecule LM, as illustrated in FIGS. 11A and 11B, it is possible to temporally change a polarization state of light passing through the liquid crystal panel PP, that is, the depolarization member PC. Accordingly, when averaging is performed by temporally superimposing the outside light passing through the depolarization member PC, the outside light enters a substantially depolarized state. By providing the depolarization member PC configured by the foregoing electric optical element in, for example, the region D3 occupied by the shade device 90 in FIG. 10, an expected goal can be achieved. That is, the depolarization member PC is considered to be provided in the entire front surface side or a part of the front surface side of the shade device 90. For example, the depolarization member PC is considered to be provided in the region D2 in FIG. 7. The foregoing examples are examples in which the depolarization member PC is variously present as the electric optical element and the same configuration may be realized using other schemes.

Figure 12A:
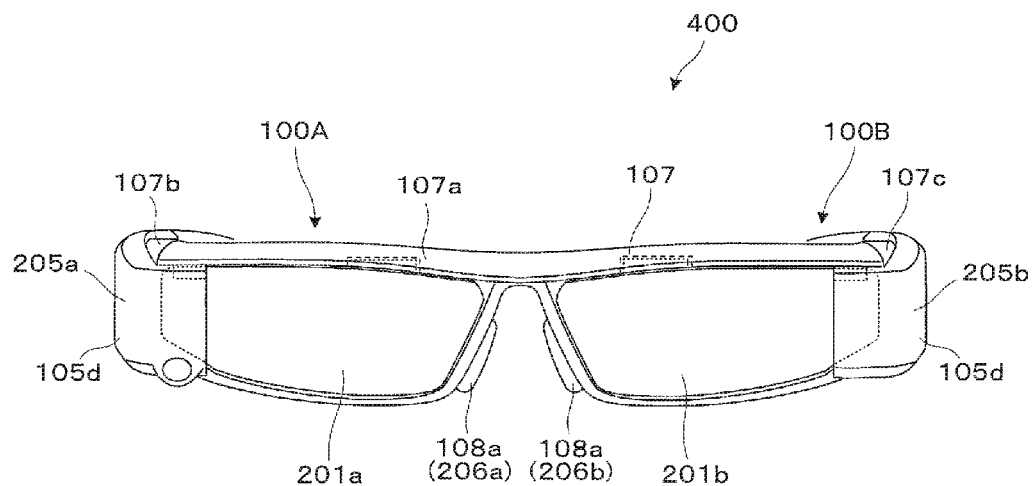
FIG. 12A is a front view illustrating a modification example of the transmissive display apparatus and FIG. 12B is a plan view illustrating the structure of a first display apparatus in a virtual image display apparatus.
Figure 12B:
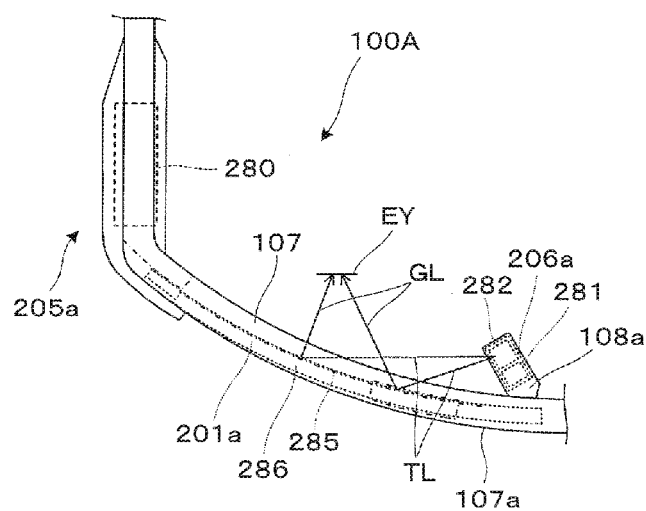

As described above, the image light (video light) modulated using the liquid crystal panel is incident on the half transmission and reflection surface, but the invention is not limited thereto. For example, as illustrated in FIGS. 12A and 12B, image light (video light) can also be configured to be incident on a half transmission and reflection surface by an MEMS.

Hereinafter, an example of a transmissive display apparatus will be described with reference to FIGS. 12A and 12B. A transmissive display apparatus 400 illustrated in the drawings includes first and second optical members 201a and 201b that screen the fronts of the eyes of an observer, a frame 107 that supports both of the optical members 201a and 201b, first and second driving units 205a and 205b that are fixed to portions extending from right and left ends of the frame 107 to the rear side, and first and second video elements 206a and 206b that emit 2-dimensionally scanned signal light. A first display apparatus 100A in which the first optical member 201a, the first driving unit 205a, and the first video element 206a on the left side of the drawing are combined is a portion that forms a right-eye virtual image and also functions as a virtual image display apparatus alone. Further, a second display apparatus 100B in which the second optical member 201b, the second driving unit 205b, and the second video element 206b on the right side of the drawing are combined is a portion that forms a left-eye virtual image and has the same function as the first display apparatus 100A by reversing the right and left of the first display apparatus 100A.

In the first display apparatus 100A, the first video element 206a forms signal light of which intensity is modulated and emits the signal light as scan light TL. The first optical member 201a is a scanned member that forms video light GL by reflecting the scan light TL from the first video element 206a and has a function of guiding the video light GL to an eye EY. The first driving unit 205a includes a light source that supplies illumination light to the first video element 206a via an optical fiber or the like (not illustrated) and a body portion 280 that includes a control circuit for such an operation.

The first video element 206a can be assembled in a nose pad member 108a and is indirectly fixed to the frame 107. The first video element 206a includes a signal light modulation unit 281 that modulates the illumination light based on a control signal from the body portion 280 and a scan optical system 282 that emits the signal light while scanning the signal light passing through the signal light modulation unit 281. Here, the scan optical system 282 is configured to include an MEMS mirror and performs 2-dimensional scanning to change an emission angle of a beam on an inside surface of the first optical member 201a by adjusting an optical path of the signal light, by vertically and horizontally changing the posture in synchronization with the modulation of the signal light by the signal light modulation unit 281.

The first optical member 201a is disposed to screen the front side of the first video element 206a or the front side of the eye EY of a wearer in a light emission direction. The first optical member 201a includes a half transmission and reflection film 285 which is a half transmission film irradiated with the scan light and a support member 286 that supports and fixes the half transmission and reflection film 285. Accordingly, not only a virtual image but also light from the outside enter the eye EY of the wearer and the virtual image display apparatus 200 has a see-through configuration superimposing both of the virtual image and the light so that the wearer can observe them. The half transmission and reflection film 285 can be configured as a half mirror and can also be configured as a hologram type or another diffraction type optical element.

For example, by providing the depolarization member PC in a predetermined region on the outside of the first and second optical members 201a and 201b in the transmissive display apparatus 400 with the foregoing configuration, it is possible to achieve an expected goal.

Figure 13:
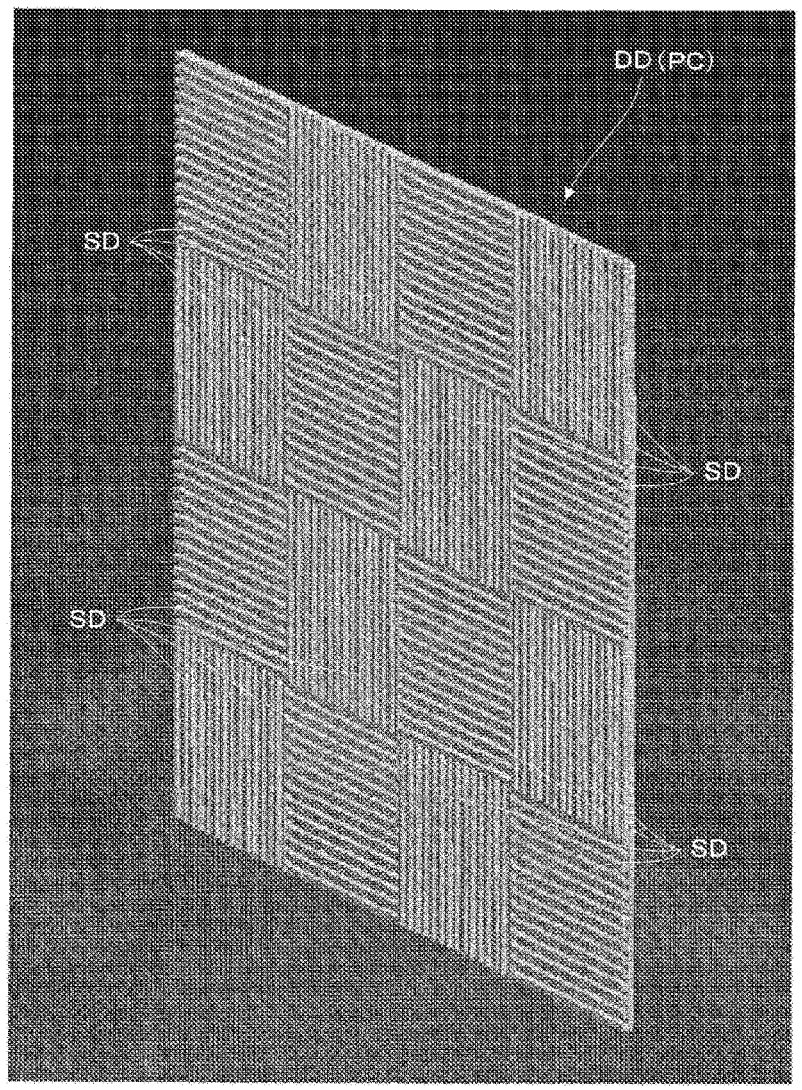
FIG. 13 is a perspective view illustrating a modification example of the depolarization member.
Figure 14B:
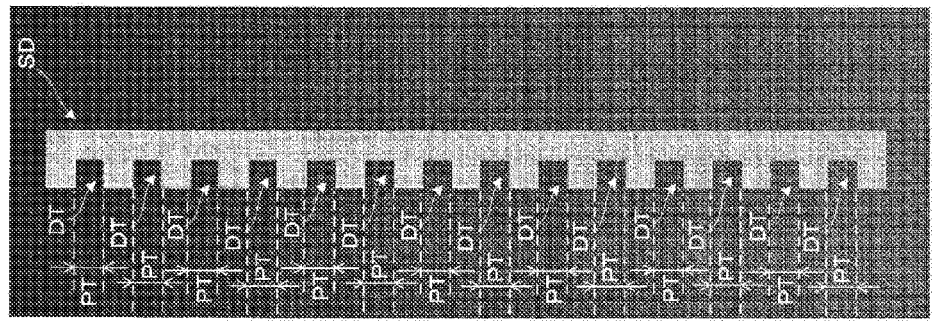
FIG. 14A is a perspective view illustrating an extracted part of the depolarization member and FIG. 14B is a side view of FIG. 14A.
Figure 14A:
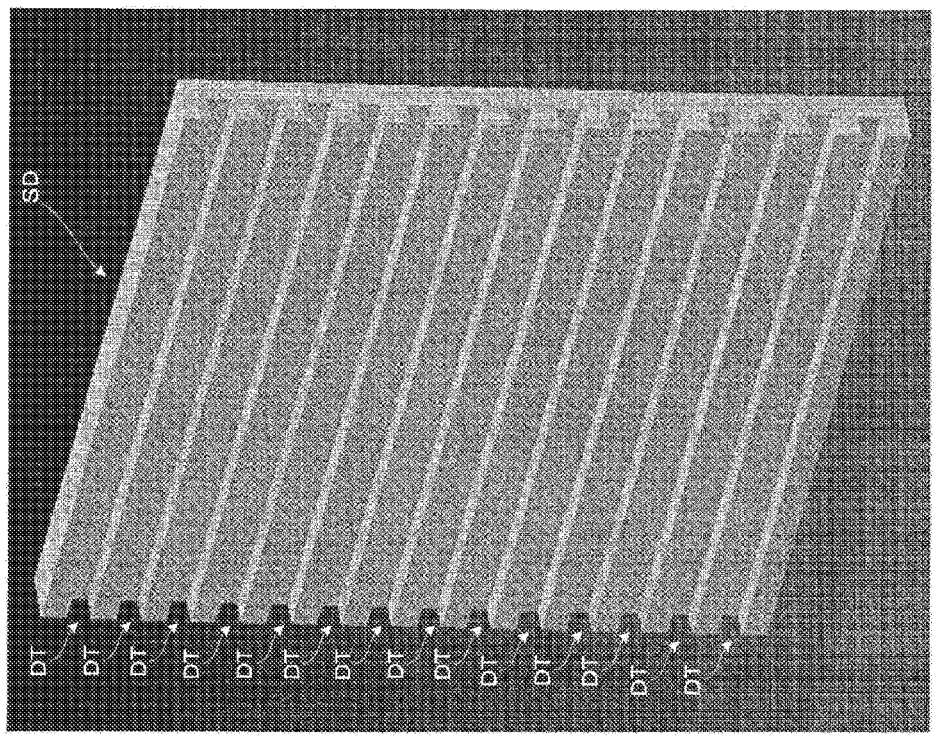

As a configuration applied as the depolarization member PC, a random local orientation phase difference member locally performing orientation in a different direction including the foregoing refractive index anisotropic material can be used, a high phase difference film can be used, or refractive index anisotropy of liquid crystal can be used. For example, as illustrated in FIGS. 13, 14A, and 14B, a depolarization member CP can also be considered to be configured by a diffraction element DD that includes a plurality of sub-wavelength gratings. Specifically, the depolarization member CP in a modification example illustrated in FIG. 13 is an element configured such that a plurality of sub-wavelength gratings SD are combined and disposed on a surface. As a part of the diffraction element DD is expanded and one sub-wavelength grading SD is extracted in FIGS. 14A and 14B, each sub-wavelength grating SD has an uneven structure of a slit shape in which a plurality of grooves DT are cut in parallel on the surface with a flat plate shape. Pitches PT of the plurality of grooves DT are shorter (less) than the wavelength of light. In other words, the diffraction element DD illustrated in FIG. 13 is a sub-wavelength grating configured to include the plurality of sub-wavelength gratings SD. Since the lengths of the pitches PT of the unevenness formed by the plurality of grooves DT are shorter than the wavelength of the light in each sub-wavelength grating SD illustrated in FIGS. 14A and 14B, a diffraction effect is generated. As a result, the effect can be provided to the polarization component of the light. At this time, the intervals of the pitches PT in each sub-wavelength grating SD disposed at each position are different. That is, different effects are provided to the polarization component of the light for each sub-wavelength grating SD disposed at each position. Accordingly, in the diffraction element DD, a locally different polarization conversion effect can be provided to the incident light. Thus, from a big viewpoint, the light can be converted into depolarized light, that is, the diffraction element DD functions as the depolarization member CP.

As the depolarization member PC, a depolarization element having an amorphous structure in which the optical axes of liquid crystal molecules locally vary to be disposed at random using a photo-polymerization type liquid crystal polymeric film can also be considered.

As described above, the intermediate image corresponding to a display image of the video display element 82 is formed inside the light-guiding member 10. However, the invention can also be applied to a transmissive display apparatus that performs see-through without forming an intermediate image.

As described above, one asymmetric aspherical surface included in the projection lens is configured. However, the projection lens can also include two or more asymmetric aspherical surfaces.

As described above, the half mirror layer (half transmission and reflection film) 15 is formed in a horizontally long rectangular region, but the contour of the half mirror layer 15 can be changed appropriately according to a use or other specifications. The transmittance and reflectance of the half mirror layer 15 can also be changed according to a use or other specifications.

As described above, the distribution of the display luminance in the video display element 82 is not particularly adjusted. However, for example, when a difference in luminance occurs depending on a position, the distribution of the display luminance can be adjusted unequally.

As described above, as the image display apparatus 80, the video display element 82 configured by a transmissive liquid crystal display device or the like is used. However, various elements can be used as the image display apparatus 80 without being limited to the video display element 82 configured by a transmissive liquid crystal display device or the like. For example, a reflective liquid crystal display device can also be used, or a digital micro-mirror device or the like can also be used instead of the video display element 82 configured by a liquid crystal device or the like. As the image display apparatus 80, a self-luminous element typified by an LED array or an OLED (organic EL) can also be used.

In the foregoing embodiment, the image display apparatus 80 configured by a transmissive liquid crystal display device or the like is used. However, instead of the transmissive liquid crystal display device, a scanning image display device can also be used.

As described above, the transmissive display apparatus 100 including one pair of display apparatuses 100A and 100B has been described but a single display apparatus can be used. That is, one pair of the see-through projection apparatus 70 and the image display apparatus 80 may not be provided to correspond to each of the right and left eyes, but the see-through projection apparatus 70 and the image display apparatus 80 may be provided for only one of the right and left eyes so that monocular vision of an image is realized.

As described above, the half mirror layer 15 is a simply half transparency film (dielectric multi-layer film). However, the half mirror layer 15 can be substituted with a hologram element of a plane surface or curved surface.

As described above, the light-guiding member 10 or the like extends in the lateral direction in which the eyes EY are arranged, but the light-guiding member 10 can also be disposed to extend in the vertical direction. In this case, the light-guiding member 10 has a parallel disposition structure in parallel rather than in series.

In the example illustrated above, the light-guiding device 20 has a single half transmission and reflection surface as the half mirror layer 15. However, a half transmission and reflection surface may be configured to be divided into a plurality of pieces.

As a new modification example, video light from a video element may be incident directly on a half transmission and reflection surface without passing through a light-guiding device or the like so that the light is incident on an eye of an observer from the half transmission and reflection surface. In this case, for example, by providing the depolarization member PC to overlap outside the half transmission and reflection surface, it is possible to achieve an expected goal.

Only the form in which the image light and the outside light are superimposed has been described above. However, for example, the invention may be applied to a transmissive display apparatus capable of switching between a form in which only image light is viewed and a form in which only outside light is viewed without superimposition.

The entire disclosure of Japanese Patent Application No. 2015-041017, filed Mar. 3, 2015 is expressly incorporated by reference herein.

What is claimed is:

1. A transmissive display apparatus that causes outside light and image light from a video element to be viewed to overlap, the display apparatus comprising:
    a semi-transmissive reflection unit that performs partial reflection and transmission of the outside light and the image light while the outside light and the image light have a polarization property; and
    a depolarization member that is disposed in a region more outside than a light-guiding region of the image light extending from the video element to an eye assumption position assumed as a position of an eye via the semi-transmissive reflection unit, using the eye assumption position as a criterion, and cancels a polarization state of the outside light passing through the semi-transmissive reflection unit and incident on the eye assumption position.

2. The transmissive display apparatus according to claim 1, further comprising:
    a light-guiding member that guides the image light from the video element to the semi-transmissive reflection unit and emits the image light passing via the semi-transmissive reflection unit; and
    a light transmission member that is bonded to the light-guiding member via the semi-transmissive reflection unit and causes the image light and the outside light to be viewed to overlap in cooperation with the light-guiding member, wherein the depolarization member is provided at a position at which the depolarization member is viewed to be superimposed on the semi-transmissive reflection unit from the eye assumption position.

3. The transmissive display apparatus according to claim 2,
wherein the depolarization member is provided to be superimposed on the semi-transmissive reflection unit on an outside of the light-guiding region of the image light.

4. The transmissive display apparatus according to claim 2,
wherein the depolarization member is provided on a surface more outside the eye assumption position than the semi-transmissive reflection unit in a surface of a light-guiding device formed by the light-guiding member and the light transmission member.

5. The transmissive display apparatus according to claim 4,
wherein the depolarization member is an electric optical element that temporally changes a refractive index through electric field driving.

6. The transmissive display apparatus according to claim 1, further comprising
a shade device that is fitted to screen at least a portion in front of the eye and has an outside light transmittance adjustment function to improve video visibility by lowering transmittance of the outside light,
wherein the depolarization member is provided in the shade device.

7. The transmissive display apparatus according to claim 1,
wherein the depolarization member is a high phase difference film.

8. The transmissive display apparatus according to claim 7,
wherein a slow axis direction of the high phase difference film is a parallel direction or a vertical direction to a horizontal direction assumed as an eye arrangement direction.

9. The transmissive display apparatus according to claim 1,
wherein the depolarization member includes a random local orientation phase difference member that locally performs orientation in a different direction including a refractive index anisotropic material.

10. The transmissive display apparatus according to claim 9,
wherein the depolarization member is an adhesion member formed by admixing the refractive index anisotropic material with an adhesive.

11. The transmissive display apparatus according to claim 1,
wherein the depolarization member is a diffraction element that includes a plurality of sub-wavelength gratings locally performing orientation in the different direction.

12. The transmissive display apparatus according to claim 1,
wherein the semi-transmissive reflection unit has a transmission property of 5% or more different polarization.

13. The transmissive display apparatus according to claim 1,
wherein the semi-transmissive reflection unit is a dielectric multi-layer film.

* * * * *